(12) United States Patent
Baert et al.

(10) Patent No.: US 11,260,623 B2
(45) Date of Patent: Mar. 1, 2022

(54) PANEL SUITABLE FOR FORMING A FLOOR COVERING, PROCESS FOR PRODUCING A PANEL, USE OF AN ADHESIVE PRECURSOR

(71) Applicant: Champion Link International Corporation, The Valley (AI)

(72) Inventors: Thomas Luc Martine Baert, Sint-Martens-Latem (BE); Anthony Drevet, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 16/626,416

(22) PCT Filed: Jun. 26, 2018

(86) PCT No.: PCT/EP2018/067070
§ 371 (c)(1),
(2) Date: Dec. 24, 2019

(87) PCT Pub. No.: WO2019/002269
PCT Pub. Date: Jan. 3, 2019

(65) Prior Publication Data
US 2020/0139675 A1    May 7, 2020

(30) Foreign Application Priority Data

Jun. 26, 2017 (NL) .................................... 2019121

(51) Int. Cl.
*B32B 3/10* (2006.01)
*B32B 13/08* (2006.01)
(Continued)

(52) U.S. Cl.
CPC ................ *B32B 13/08* (2013.01); *B32B 3/06* (2013.01); *B32B 7/12* (2013.01); *B32B 27/10* (2013.01);
(Continued)

(58) Field of Classification Search
None
See application file for complete search history.

(56) References Cited

U.S. PATENT DOCUMENTS 5,256,222 A    10/1993  Shepherd et al.
6,479,584 B1 *  11/2002  Nakagawa ............ C08L 53/005
                                                          525/100
(Continued)

FOREIGN PATENT DOCUMENTS

CN    103228736 A    7/2013
EP    0561086 A1    9/1993
(Continued)

OTHER PUBLICATIONS

International Search Report for PCT/EP2018/067070 (4 pages). (Year: 2019).*

*Primary Examiner* — Christopher M Polley
(74) *Attorney, Agent, or Firm* — The Webb Law Firm

(57) ABSTRACT

A panel suitable for forming a floor covering by assembling a plurality of said panels adjacent to each other, which is of a substantially planar design, having a planar top side and a planar bottom side, said panel being composed from a layered structure that comprises:
   a waterproof core layer;
   a top layer adhered on the top side of said core layer, wherein the top layer comprises at least one ply of cured resin impregnated paper;
   an adhesive layer between the core layer and the top layer;
characterized in that
the adhesive layer is a cured mixture which comprises
   a polymeric adhesive compound, and
   an additional constituent which is either
      at least one resin component which is also present in the cured resin impregnated paper, and which is not included in the polymeric adhesive compound, or
   an epoxy resin.

18 Claims, 2 Drawing Sheets

(51) Int. Cl.
  *B32B 3/06* (2006.01)
  *B32B 7/12* (2006.01)
  *B32B 27/10* (2006.01)
  *B32B 37/12* (2006.01)
  *E04F 15/02* (2006.01)
  *E04F 15/10* (2006.01)
  *B32B 29/00* (2006.01)

(52) U.S. Cl.
  CPC ........ *B32B 37/12* (2013.01); *E04F 15/02038* (2013.01); *E04F 15/107* (2013.01); *B32B 29/002* (2013.01); *B32B 2260/028* (2013.01); *B32B 2260/046* (2013.01); *B32B 2307/554* (2013.01); *B32B 2307/7265* (2013.01); *B32B 2307/734* (2013.01); *B32B 2419/04* (2013.01); *B32B 2607/00* (2013.01); *E04F 2201/0153* (2013.01); *E04F 2201/023* (2013.01); *E04F 2201/043* (2013.01); *Y10T 428/24802* (2015.01); *Y10T 428/24818* (2015.01)

(56) References Cited

U.S. PATENT DOCUMENTS

| | | | |
|---|---|---|---|
| 7,763,345 | B2 * | 7/2010 | Chen .................. B32B 3/06 |
| | | | 428/195.1 |
| 8,907,024 | B2 | 12/2014 | Miyafuji et al. |
| 2013/0274410 | A1 * | 10/2013 | Miyafuji .............. C09J 183/16 |
| | | | 524/588 |
| 2015/0368912 | A1 | 12/2015 | Baert et al. |
| 2019/0040635 | A1 | 2/2019 | Baert et al. |

FOREIGN PATENT DOCUMENTS

| | | |
|---|---|---|
| EP | 2060389 A1 | 5/2009 |
| EP | 2957691 A1 | 12/2015 |
| JP | H04-101846 A | 4/1992 |
| JP | H09-193310 A | 7/1997 |
| WO | 2017133804 A1 | 8/2017 |

\* cited by examiner

PANEL SUITABLE FOR FORMING A FLOOR COVERING, PROCESS FOR PRODUCING A PANEL, USE OF AN ADHESIVE PRECURSOR

CROSS-REFERENCE TO RELATED APPLICATIONS

This application is the United States national phase of International Application No. PCT/EP2018/067070 filed Jun. 26, 2018, and claims priority to The Netherlands Patent Application No. 2019121 filed Jun. 26, 2017, the disclosures of which are hereby incorporated by reference in their entirety.

BACKGROUND OF THE INVENTION

Field of the Invention

The present invention relates to a panel suitable for forming a floor covering by assembling a plurality of said panels adjacent to each other,
 which is of a substantially planar design, having a planar top side and a planar bottom side, said panel being composed from a layered structure that comprises:
  a waterproof core layer;
  a top layer adhered on the top side of said core layer, wherein the top layer comprises at least one ply of cured resin impregnated paper;
  an adhesive layer between the core layer and the top layer.

The invention further relates to a process for producing such a panel, and the use of an adhesive precursor in such a process.

Description of the Related Art

An above described panel is known from U.S. Pat. No. 7,763,345 which discloses the use of a polyurethane adhesive between the core layer and a urea-formaldehyde impregnated paper layer. According to the present invention, the bonding strength between adhesive layer and core resulting from this application would be satisfactory; however, the bonding strength between adhesive layer and the urea-formaldehyde impregnated paper layer would be insufficient for the intended use.

Throughout this application, waterproof indicates that the material or layer does not degrade under conditions of moisture, which is a known meaning of the word in the art. A common method of testing is disclosed in EN 13229: swelling of the core board. According to industry standards for laminate, a swelling rate of <16% is considered low. The swelling rate of a "Waterproof" layer as described in the present invention, would be <1% and more preferably <0.1% after being submerged for 24 hours.

In the technical field of panels for floor covering, it is generally attractive when the top layer comprises at least one ply of cured resin impregnated paper. These resin impregnated paper layers pose less risks to human health than regular plastic layers, because their plasticizer content is very low, or even zero. Furthermore, these plies have suitable properties to be useful as both a decorative layer and a wear layer—which are the main functions of the top layer. The core material is chosen such that it is sufficiently rigid and light-weight for its intended use.

The main layer and the top layer of such panels are typically produced in separate processes, wherein the top layer is cured by heating under pressure (high-pressure lamination). Typically, the top layer contains a number of plies, for instance 5 to 8, so that an integral top layer is produced with sufficient dimensional stability and stiffness for further processing. These plies typically rely on using so-called Kraft paper for structural stability.

The top layer is adhered to the core layer by first applying a reactive adhesive layer on the core layer, and the application on the adhesive layer of a top layer, under pressure.

The above process of production requires two curing steps: one for the top layer (high pressure lamination), and one for the curing of the adhesive layer. This results in higher costs in terms of required energy and time. In addition, the separate top layer that is produced should have sufficient integrity of its own for further processing.

In order to reach this goal, the layered top layer need to be thick enough (at least 0.4 mm and generally around 0.8 mm to 1.0 mm). This layered top layer being made of cellulosic material is naturally hygroscopic. This means that when the top layer is adhered to the core, the final laminated product will also be hygroscopic. When room humidity raises, the top layer will expand and in consequence the final laminated product will start to bend downward. In opposite, when room humidity decrease the top layer will shrink and in consequence the final laminated product will start to bend upward. In order to prevent such bending, the core need to be rigid enough to counter balance the shrinking and expansion force. A backing layer adhered on the bottom side of the core is almost mandatory to balance the tension. Therefore, using an impregnated paper top layer on top of a waterproof core is costly because the core need to be thick and rigid to prevent bending.

Even when the above additional measures are taken, the dimensional stability of the finally obtained, layered structure may still be compromised to some extent when applying this process.

It is an objective of the invention, to limit or eliminate the above indicated drawbacks of the known process for producing a panel. Ideally, the new process is adapted in such a way that the panel is easier produced, is more cost-effective, and has an improved dimensional stability.

SUMMARY OF THE INVENTION

According to a first aspect of the invention, the above objective is met by providing a panel of the above type, which is characterized in that
 the adhesive layer is a cured mixture which comprises
  a polymeric adhesive compound, and
  an additional constituent which is either
   at least one resin component which is also present in the cured resin impregnated paper, and which is not included in the polymeric adhesive compound, or
   an epoxy resin.

The adhesive layer as such, has a hybrid character in that it has a polymeric adhesive compound which makes it generally compatible for adhesion to the waterproof core layer, and an additional constituent that imparts to the adhesive layer a compatibility for adhesion to a ply of resin impregnated paper.

The additional constituent is a resin component which is also present in the cured resin impregnated paper, and which is not included in the polymeric adhesive compound. An alternative which was found also to be effective, is an epoxy resin.

The adhesive layer according to the invention allows not only for a satisfactory adhesion between the waterproof core layer and the top layer, but also for a production process that is significantly simplified in comparison to the known process of production.

The inclusion of an additional constituent that is able to react (bond) with the thermosetting urea-formaldehyde polymer in the paper layer provides the benefits aimed at by the present invention.

Preferably, in the panel according to the invention, the waterproof core layer is made from a mineral material, or a thermoplastic material.

For the material of the waterproof core a wide range of materials may be considered, provided these are suitable for the intended use, which requires they contain less than 30 wt. % of cellulosic and/or plant material.

As a mineral material, magnesium oxide and/or magnesium hydroxide, combined with a suitable binder can be used. A suitable binder is magnesium chloride, magnesium sulfate, ferric sulfate, potassium salt, a plastic material, or an adhesive, or a combination of these compounds. As an alternative mineral material, portland cement based material may be considered.

As a thermoplastic material, PVC or other vinylic compounds are typically suitable, as well as PE, PU or PP.

In particular it is preferred in the panel according to the invention, that the polymeric adhesive compound is a polyurethane or a polyester.

The polymeric adhesive is preferably a heat activated type of adhesive which comprise a main resin (preferably polyurethane or polyester) and an hardener (for example a MDI isomer: 4,4'-Diphenylmethane diisocyanate).

The main resin needs to be activated with heat in order to react with the hardener. The main resin reaction with the hardener results in the curing of the adhesive.

With further preference, in the panel according to the invention, the at least one resin component is urea, phenol, and/or polyurethane.

Preferred examples of an epoxy resin that are useful for the invention, are Poly-1,4-butylene adipate and/or Bisphenol A epoxy resin.

Further preferably, in the panel according to the invention, the ply of cured resin impregnated paper comprises ureaformaldehyde or polyurethane as resin.

It is especially preferred in the panel according to the invention, that the top layer comprises a maximum of one or two plies of cured resin impregnated paper.

Such a top layer achieves with a minimum of plies, a satisfactory functionality for a decorative layer and/or wear layer, while it reduces the hygroscopic force of the paper layers significantly.

For its suitability of assembling a floor covering it preferred that the panel according to the invention has at least four substantially linear side edges.

In addition it is particularly preferred, that the linear side edges comprise at least one pair of opposite side edges which are provided with interconnecting coupling means for interconnecting one panel within another. For instance, these coupling means may be devised according to the well-known groove/tongue types that are ubiquitous in the field.

By virtue of such coupling means, a so-called free-floating floor covering can be assembled, without the need of glue of cement to attach adjacent panels to each other in a fixed manner.

In a special embodiment of the panel according to the invention, it further comprises a bottom layer adhered to the bottom side of said core layer, wherein the bottom layer comprises at least one ply of cured resin impregnated paper.

In a second aspect, the invention provides a process for producing a panel according to the first aspect, comprising the steps of:
a) providing a waterproof core layer;
b) applying a layer of adhesive precursor on the top side of the core layer;
c) drying the layer of adhesive precursor;
d) applying at least one ply of non-cured resin impregnated paper on top of the dried layer of adhesive precursor;
e) applying pressure and heat on the assembly obtained in step d), so that the dried layer of adhesive precursor and the resin in the non-cured resin impregnated paper are activated simultaneously.

The process as a whole requires one step in which pressure and heat are required, and in which step both the adhesive layer and the resin are activated in order to allow for the formation of the final product, which is obtained after cooling off of the assembly formed. Consequently, the process is less time and energy consuming than the known processes.

Furthermore, as the process allows the plies of non-cured resin impregnated paper to be directly applied to the adhesive layer, there are no requirements as to the individual integrity of the top layer as in the known processes. Consequently, less plies may be used, and actually 1 or 2 plies are possible as a top layer, which further reduces the required costs and time, and is beneficial to hygroscopic properties of the end product as stated above.

In that context, it is preferred that in step d) a maximum of one or two plies of non-cured resin impregnated paper are applied on top of the partially cured adhesive layer. The advantages have already been discussed above.

In addition it is noted that the finally obtained product has an improved dimensional stability, because the number of paper plies is limited.

It is especially preferred in the process according to the invention, that the adhesive precursor is a mixture which comprises
a reactive mixture being a precursor of a polymeric adhesive compound, and
an additional constituent which is either:
at least one resin component which is also present in the non-cured resin impregnated paper, and which is not included in the precursor of the polymeric adhesive compound, or
a precursor of an epoxy resin.

In the above context, the term precursor is used to express a composition which is capable of reacting further to form a polymeric structure of the indicated type.

The term resin component, refers to one component from the mixture that forms the non-cured resin that is used in the impregnated paper.

Preferably, the adhesive precursor contains a hardener, especially a hardener for the precursor of the polymeric adhesive compound (e.g. PU or PE).

In step c), the act of drying allows any solvents being present in the mixture of the adhesive precursor, to evaporate under mild heating. The drying step does not promote the adhesive precursor to react already into a fully cured, adhesive layer. In the process according to the invention, it is preferred that the waterproof core layer is made from a mineral material, or a thermoplastic material. Suitable examples of such materials are already discussed above.

Analogous to the first aspect of the invention, the following features are preferred in the process according to the invention:

the polymeric adhesive compound is a polyurethane or a polyester.

the at least one resin component is urea, phenol, and/or polyurethane.

the ply of non-cured resin impregnated paper comprises urea-formaldehyde or polyurethane as resin.

Simultaneous, and analogous to the adhesion of a top layer on the top side of a core layer in the above process according to the invention, a bottom layer may be adhered to the bottom side of said core layer, wherein the bottom layer similarly comprises at least one ply of cured resin impregnated paper.

A third aspect of the invention, relates to a use of an adhesive precursor for adhering at least one ply of non-cured resin impregnated paper onto one side of a core layer, wherein the adhesive precursor is a mixture which comprises a reactive mixture being a precursor of a polymeric adhesive compound, and an additional constituent which is either:

at least one resin component which is also present in the non-cured resin impregnated paper, and which is not included in the precursor of the polymeric adhesive compound, or a precursor of an epoxy resin.

The advantages of such a use have been described in view of the second aspect of the invention.

In a preferred fashion of the use according to the invention, the adhesive precursor is applied on the one side of the core layer and subsequently dried before at least one ply of non-cured resin impregnated paper is adhered onto the core layer.

DESCRIPTION OF THE INVENTION

Figure 1:
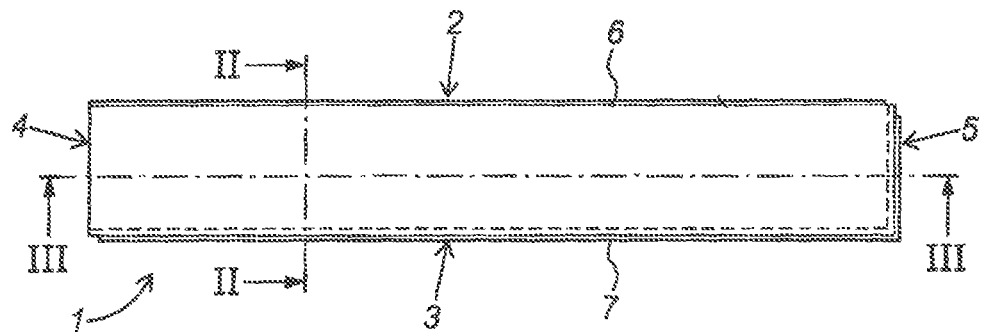
FIG. 1 is a top view of a panel.
Figure 2:
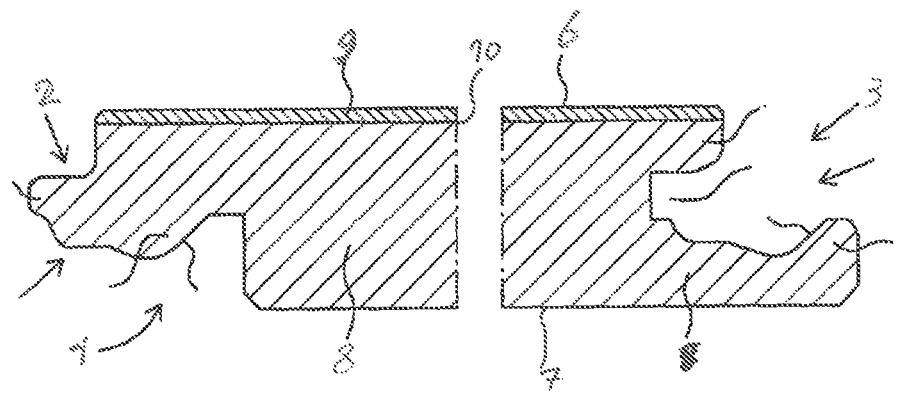
FIGS. 2 and 3 show cross-sections of the panel of FIG. 1 taken along lines II and III, respectively.
Figure 3:
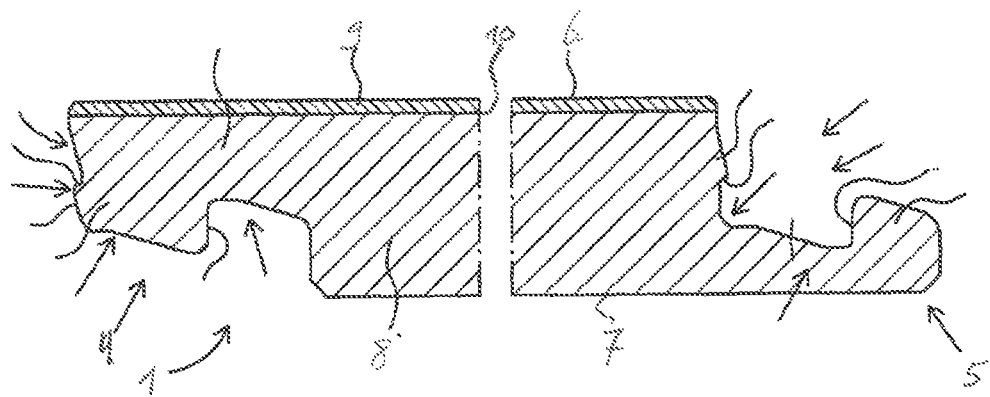
Figure 4:
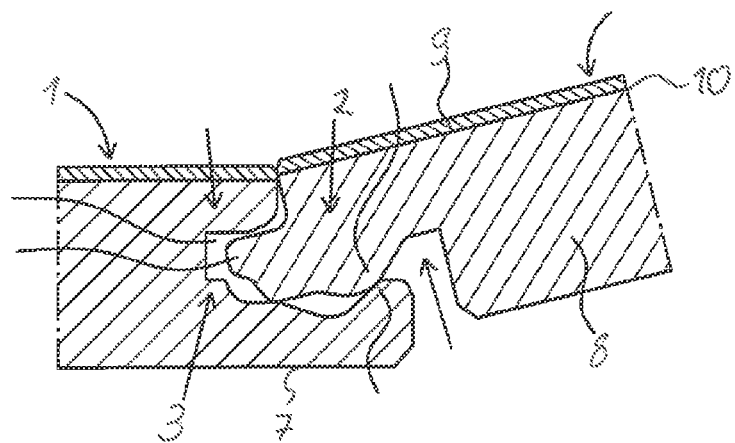
FIGS. 4 AND 5 show how the panel of FIG. 1 can be interconnected at its long sides.
Figure 5:
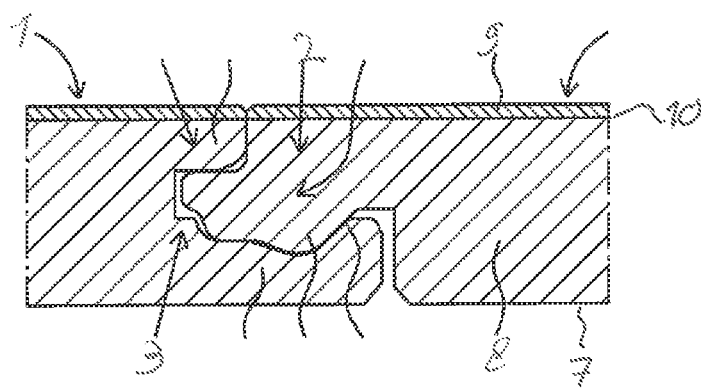

Panel 1 suitable for forming a floor covering by assembling a plurality of said panels 1 adjacent to each other, which is of a substantially planar design, having a planar top side 6 and a planar bottom side 7, said panel 1 being composed from a layered structure that comprises: a waterproof core layer 8; a top layer 9 adhered on the top side of said core layer 8, wherein the top layer 9 comprises at least one ply of cured resin impregnated paper; an adhesive layer between the core layer 8 and the top layer 9; the adhesive layer 10 is a cured mixture which comprises a polymeric adhesive compound, and an additional constituent which is either at least one resin component which is also present in the cured resin impregnated paper, and which is not included in the polymeric adhesive compound, or an epoxy resin. The panel has at least four substantially linear side edges. The linear side edges comprising at least one par of opposite side edges 2.3 or 2.4 which are provided with interconnecting coupling means for interconnecting one panel within another.

The invention claimed is:

1. A panel suitable for forming a floor covering by assembling a plurality of said panels adjacent to each other, which is of a substantially planar design, having a planar top side and a planar bottom side, said panel being composed from a layered structure that comprises:

a waterproof core layer;

a top layer adhered on the top side of said core layer, wherein the top layer comprises at least one ply of cured resin impregnated paper;

an adhesive layer between the core layer and the top layer;

wherein the adhesive layer is a cured mixture which comprises a polymeric adhesive compound, and an additional constituent which is either at least one resin component which is also present in the cured resin impregnated paper, and which is not included in the polymeric adhesive compound, or an epoxy resin.

2. The panel according to claim 1, wherein the additional constituent is an epoxy resin, comprising Poly-1,4-butylene adipate and/or Bisphenol A epoxy resin.

3. The panel according to claim 1, wherein the core layer is made from a mineral material, or a thermoplastic material.

4. The panel according to claim 1, wherein the polymeric adhesive compound is a polyurethane or a polyester.

5. The panel according to claim 1, wherein the at least one resin component is urea, phenol, and/or polyurethane.

6. The panel according to claim 1, wherein the ply of cured resin impregnated paper comprises urea-formaldehyde or polyurethane as resin.

7. The panel according to claim 1, wherein the top layer comprises a maximum of one or two plies of cured resin impregnated paper.

8. The panel according to claim 1, which has at least four substantially linear side edges.

9. The panel according to claim 8, the linear side edges comprising at least one pair of opposite side edges which are provided with interconnecting coupling means for interconnecting one panel within another.

10. A process for producing a panel according to claim 1, comprising the steps of:

a) providing a waterproof core layer;

b) applying a layer of adhesive precursor on the top side of the core layer;

c) drying the layer of adhesive precursor;

d) applying at least one ply of non-cured resin impregnated paper on top of the dried layer of adhesive precursor;

e) applying pressure and heat on the assembly obtained in step d), so that the dried layer of adhesive precursor and the resin in the non-cured resin impregnated paper are activated simultaneously.

11. The process according to claim 10, wherein in step d) a maximum of one or two plies of non-cured resin impregnated paper are applied on top of the adhesive layer.

12. The process according to claim 10, wherein the adhesive precursor is a mixture which comprises a reactive mixture being a precursor of a polymeric adhesive compound, and an additional constituent which is either:

at least one resin component which is also present in the non-cured resin impregnated paper, and which is not included in the precursor of the polymeric adhesive compound, or a precursor of an epoxy resin.

13. The process according to claim 10, wherein the core layer is made from a mineral material, or a thermoplastic material.

14. The process according to claim 10, wherein the polymeric adhesive compound is a polyurethane or a polyester.

15. The process according to claim 10, wherein the at least one resin precursor is urea, phenol, and/or polyurethane.

16. The process according to claim 10, wherein the ply of non-cured resin impregnated paper comprises urea-formaldehyde or polyurethane as resin.

17. A method of using an adhesive precursor for adhering at least one ply of non-cured resin impregnated paper onto one side of a core layer,
wherein the adhesive precursor is a mixture which comprises
a reactive mixture being a precursor of a polymeric adhesive compound, and
an additional constituent which is either:
at least one resin component which is also present in the non-cured resin impregnated paper, and which is not included in the precursor of the polymeric adhesive compound, or
a precursor of an epoxy resin.

18. The method of using according to claim 17, wherein the adhesive precursor is applied on the one side of the core layer and subsequently dried, before at least one ply of non-cured resin impregnated paper is adhered onto the core layer.

* * * * *